US010346186B2

(12) United States Patent
Kalyanpur (10) Patent No.: US 10,346,186 B2
(45) Date of Patent: Jul. 9, 2019

(54) SYSTEM AND METHOD FOR SIMULATING INTERNET BROWSING SYSTEM FOR USER WITHOUT GRAPHICAL USER INTERFACE (71) Applicant: Rohan Kalyanpur, New York, NY (US)

(72) Inventor: Rohan Kalyanpur, New York, NY (US)

( * ) Notice: Subject to any disclaimer, the term of this patent is extended or adjusted under 35 U.S.C. 154(b) by 538 days.

(21) Appl. No.: 14/965,896

(22) Filed: Dec. 10, 2015

(65) Prior Publication Data
US 2016/0170778 A1 Jun. 16, 2016

Related U.S. Application Data

(60) Provisional application No. 62/090,394, filed on Dec. 11, 2014.

(51) Int. Cl.
*G06F 9/455* (2018.01)
*H04L 29/08* (2006.01)
(Continued)

(52) U.S. Cl.
CPC .............. *G06F 9/455* (2013.01); *G06F 9/451* (2018.02); *G06F 16/954* (2019.01);
(Continued)

(58) Field of Classification Search
CPC .... G06F 9/455; G06F 9/4443; G06F 17/3087; G06F 17/30873; G06F 17/30876; G06F 21/6263; H04L 67/02
See application file for complete search history.

(56) References Cited

U.S. PATENT DOCUMENTS

| 7,103,714 B1 * | 9/2006 | Jacobs | G06F 17/30902 707/E17.12 |
| 7,533,012 B2 * | 5/2009 | Walsh | H04L 41/145 703/21 |

(Continued)

OTHER PUBLICATIONS

Ugo Fiore et al, Countering Browser Fingerprinting Techniques: Constructing a Fake Profile with Google Chrome, International Conference o Network-Based Information System, Italy, Sep. 2014. p. 355-360.*

(Continued)

*Primary Examiner* — Rehana Perveen
*Assistant Examiner* — Chuen-Meei Gan
(74) *Attorney, Agent, or Firm* — Barry Choobin; Patent 360 LLC (57) ABSTRACT

The embodiments herein provide a system and a method of simulating internet browsing system without a graphical user interface. The method comprises the steps of extracting browser characteristics of a real user browser. The internet browsing system is simulated without graphical user interface by including the browser character of a real user browser within the simulated virtual user browser to makes the simulated virtual user digitally identical to the real user browser. Further, the tracking elements of the real user browser are shared with the simulated virtual user browser to divert the internet trackers away from the real user browser. Further, a fingerprint on the real user browser is duplicated in the simulated virtual user browser. The method uses an algorithm to simulate the simulated virtual user browser. The algorithm is intent to sell and purchase goods and services, thereby misguiding the internet trackers.

6 Claims, 7 Drawing Sheets

(51) Int. Cl.
  *G06F 21/62* (2013.01)
  *G06F 9/451* (2018.01)
  *G06F 16/955* (2019.01)
  *G06F 16/9537* (2019.01)
  *G06F 16/954* (2019.01)

(52) U.S. Cl.
  CPC ........ *G06F 16/955* (2019.01); *G06F 16/9537* (2019.01); *G06F 21/6263* (2013.01); *H04L 67/02* (2013.01)

(56) References Cited

U.S. PATENT DOCUMENTS

| | | | | |
|---|---|---|---|---|
| 8,943,602 B2* | 1/2015 | Roy | .................... | G06F 21/6263 726/26 |
| 9,081,953 B2* | 7/2015 | B'Far | ..................... | G06F 21/50 |
| 9,384,356 B2* | 7/2016 | Simske | ............. | G06Q 30/0201 |
| 9,589,149 B2* | 3/2017 | Livshits | .............. | G06F 21/6245 |
| 2015/0100660 A1* | 4/2015 | Flack | ............... | H04N 21/23106 709/213 |
| 2015/0207897 A1* | 7/2015 | Flack | .................. | H04L 67/2842 709/213 |

OTHER PUBLICATIONS

Franziska Roesner et al, Detecting and Defending Against Third-arty Tracking on the Web, 9th USENIX Symposium on Networked Syste,s Design and Implementation (2012). p. 1-14.*

Toubiana, Vincent, Lakshminarayanan Subramanian, and Helen Nissenbaum. "Trackmenot: Enhancing the privacy of web search." arXiv preprint arXiv:1109.4677 (2011). (Year: 2011).*

Vernacular resistance to data collection and analysis: A political theory of obfuscation by Finn Brunton and Helen Nissenbaum. First Monday, vol. 16, No. 5—May 2, 2011 (Year: 2011).*

Satvat, Kiavash, Matthew Forshaw, Feng Hao, and Ehsan Toreini. "On the privacy of private browsing—a forensic approach." In Data Privacy Management and Autonomous Spontaneous Security, pp. 380-389. Springer, Berlin, Heidelberg, 2014. (Year: 2014).*

* cited by examiner

SYSTEM AND METHOD FOR SIMULATING INTERNET BROWSING SYSTEM FOR USER WITHOUT GRAPHICAL USER INTERFACE

CROSS REFERENCE TO RELATED APPLICATIONS

This application claims priority of the U.S. Provisional Patent Application with Ser. No. 62/090,394 filed on Dec. 11, 2014 with the title "SYSTEM AND METHOD FOR SIMULATING INTERNET BROWSING SYSTEM FOR USER WITHOUT GRAPHICAL USER INTERFACE", and the contents of which are incorporated entirely as reference herein.

BACKGROUND

Technical Field

The embodiments herein are generally related to internet browsing technology. The embodiments herein more particularly relate to a system and method for protecting a privacy of the users during Internet browsing process. The embodiments herein are especially related to a system and method for simulating a user internet browsing condition or scenario with an algorithm but without a graphical user interface. The embodiments herein are further related to a system and a method for preventing effective device fingerprinting across any computing device by using multiple fingerprints.

Description of the Related Art

Privacy to a user while browsing Internet is a very important for digital security. Apart from the danger of sharing sensitive information to unauthorized and possibly malicious elements, the technologies that enable tracking an internet user's online activities has led to the users being targets of large-scale online advertisements.

Currently, users browse Internet in predominantly two modes such as a masked or "incognito" mode to hide the user identity, or without any masking, thereby allowing oneself to be tracked throughout the internet. By browsing in masked mode, the user gives up all the benefits of a user experience provided by the cookies. This option is not only inconvenient, but also not very effective in avoiding user tracking.

By browsing without masking, the third parties are able to gather information from a user's cookies. The user is exposed to tracking while browsing internet and there is a complete loss of privacy.

Hence, there is a need for developing a system and method for enabling an internet user to have the benefits of cookies and prevent third parties from tracking the user. A virtual interact user is created by simulating an internet user browsing through internet using an algorithm.

The above mentioned shortcomings, disadvantages and problems are addressed herein and which will be understood by reading and studying the following specification.

OBJECTS OF THE EMBODIMENTS

The primary object of the embodiments herein is to provide a system and method for simulating a virtual internet user in order to protect the privacy of an actual internet user with an algorithm.

Another object of the embodiments herein is to provide a system and method for simulating a virtual internet user without a graphical user interface.

Yet another object of the embodiments herein is to provide a system and method for simulating internet browsing using the actual users cookies and an algorithm, so that trackers are unable to distinguish the real user from the simulated users.

Yet another object of the embodiments herein is to provide a system and method for simulating interact browsing system by incorporating browsing characteristics of the real user, thereby providing digitally identical browsing characteristic to the simulated browser.

Yet another object of the embodiments herein is to provide a system and method for simulating a plurality of versions of a same internet user, with each simulated user positioned at a different global location thereby making a tracking of the real user difficult.

Yet another object of the embodiments herein is to provide a system and method to enable users browse internet with privacy but without an inconvenience of masking or browsing "incognito".

Yet another object of the embodiments herein is to provide a system and method for extracting and using user cookies and local storage information of an internet user, regardless of the physical internet browser used by the user.

Yet another object of the embodiments herein is to provide a system and method for merging an actual internet user's cookies and local storage information with a real user's interact browser so that a tracking information disseminated during a simulated browsing is a part of the user's physical browser.

Yet another object of the embodiments herein is to provide a system and method for simulating internet browsing using an algorithm, so that the simulated internet user shows an intent to purchase or sell products and services.

Yet another object of the embodiments herein is to provide a system and method for algorithmically simulating internet browsing without a graphical user interface to provide a non-invasive experience to the user by running the simulated internet user in the background.

Yet another object of the embodiments herein is to provide a system and method for implementing techniques to prevent the trackers from distinguishing a real-user from an algorithmically simulated user.

Yet another object of the embodiments herein is to provide a system and method for enabling one algorithmically simulated internet user for each real user, so that the simulated user has multiple interests that mask the actual browsing interests of the real user.

Yet another object of the embodiments herein is to provide a system and method for algorithmically simulating Internet browsing using the actual users' browser fingerprint, so that trackers are unable to distinguish the real user from the simulated user. The simulated users use the same finger printing characteristics of the real user.

Yet another object of the embodiments herein is to provide a system and method for simulating a virtual internet-browsing user, through proprietary algorithms that display a real intent to purchases goods and services on internet, so that the third party trackers are drawn towards the simulated user and away from the real user.

Yet another object of the embodiments herein is to provide a system and method for simulating a virtual internet-browsing user, enabled with real-time exchange of tracking elements such as cookies, HTML5 local storage, indexed database etc., with a real user.

Yet another object of the embodiments herein is to provide a method for preventing effective device fingerprinting across any computing device including mobile and non mobile computing devices by generating multiple finger prints.

Yet another object of the embodiments herein is to provide a system and method to change device finger printing at periodic time intervals by randomly changing the device finger printing characteristics comprising the elements such as cookies, HTML5 local storage, indexed database etc., to create a plurality of fingerprints for the same real user to mask the real user.

Yet another object of the embodiments herein is to provide a method to enable user-privacy against fingerprinting, by creating an unstable fingerprint so that a same device appears to have a different device fingerprint at various points in time.

Yet another object of the embodiments herein is to provide a method and system to change the finger print of the real user during a browsing process.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide system and method for simulating a virtual internet user using an algorithm to protect the privacy of an actual internet user. For every real internet user, one algorithmically simulated virtual user is run in the background of the computing device, without a graphical user interface.

According to an embodiment herein, the simulated user browser is created to include the plurality of extracted browser characteristics, the plurality of detected tracking elements and the plurality of identified device finger printing characteristics of the real user.

According to an embodiment herein, the browser characteristics of the simulated virtual user is digitally identical to the extracted browser characteristics of the real user browser.

According to an embodiment herein, the detected tracking elements of the real user browser is embedded in the simulated virtual user browser to draw an internet tracker away from the real user browser.

According to an embodiment herein, the plurality of identified device finger printing characteristics of the real user browser is duplicated on the simulated user browser.

According to an embodiment herein, the browser characteristics are selected from a group consisting of IP address, user agent, browser fonts, plugins, browser name and browser versions.

According to an embodiment herein, the tracking elements are selected from a group consisting of persistent cookies, html5 local storage and indexed database.

According to an embodiment herein, the plurality of identified device finger printing characteristics of the real user browser is duplicated on the simulated user browser by creating an unstable fingerprint to protect a user-privacy against fingerprinting to configure a single device to have a plurality of device finger printing characteristics at a plurality of time periods respectively. The plurality of device finger printing characteristics at a plurality of time periods are mutually different.

According to an embodiment herein, the plurality of identified device finger printing characteristics of the real user browser is duplicated on the simulated user to mask the real user browser.

According to an embodiment herein, the plurality of the device finger printing characteristics of the simulated user is identical to the device finger printing characteristics of the real user browser.

According to an embodiment herein, the simulated user browser is created without visual inputs and user inputs via a GUI to provide a non-invasive experience to the user by running the simulated user browser in the background.

According to an embodiment herein, the simulated user browser is created in real time.

According to an embodiment herein, the simulated user browser is created when the real user browses on the internet or when the user stays away from the system.

According to one embodiment herein, a method of simulating internet browsing system without graphical user interface (GUI) is provided. The method comprises the steps of extracting browser characteristics of a real user browser. The internet browsing system is simulated without the GUI. The internet browsing system is simulated to create a simulated virtual user browser by incorporating, the browser character of a real user browser within the simulated virtual user browser. The browser characteristics are included to make the simulated virtual user digitally identical to the real user browser. The tracking elements of the real user browser are shared with the simulated virtual user browser. The tracking elements are embedded in the simulated virtual user browser to draw the Internet trackers away from the real user browser. The fingerprint on the real user browser is duplicated in the simulated virtual user browser. The simulated virtual user browser is simulated by executing an algorithm without GUI. The algorithm is intent to sell and purchase goods and services from the internet, thereby misguiding the trackers from the real user browser.

According to one embodiment herein, a method of simulating internet browsing system without graphical user interface (GUI) includes browser characteristics selected from a group consisting of IP address, user agent, browser fonts, plugins, browser name and browser versions.

According to one embodiment herein, a method of simulating internet browsing system without graphical user interface (GUI) comprises the tracking elements selected from a group consisting of persistent cookies, html5 local storage and Indexed database.

According to one embodiment herein, a method of simulating internet browsing system without graphical user interface (GUI) comprises duplication of a device fingerprint to enable a user-privacy against fingerprinting by creating an unstable fingerprint so that a same device appears to have a plurality of device fingerprints at various points in time. The plurality of device finger prints are mutually different.

According to one embodiment herein, a method of simulating internet browsing system without graphical user interface (GUI) comprises the duplication of device fingerprint to enable the simulated user browser to have a device fingerprint characteristics which are identical to that of a real user browser. The identical device fingerprint characteristics are provided to draw the internet trackers away from the real user browser.

According to one embodiment herein, a method of simulating internet browsing system without graphical user interface (GUI) comprises the algorithm to be executed based on a plurality of interests of the real user. The algorithm is configured to provide the simulated user browser with the plurality of interests.

According to one embodiment herein, a method of simulating internet browsing system without graphical user interface (GUI) comprises creating the simulated user browser without visual inputs and user inputs through a GUI to provide a non-invasive experience to the user by running the simulated internet user in the background.

According to one embodiment herein, a method of simulating internet browsing system without graphical user interface (GUI) comprises creating the simulated user browser either in real time when the real user browses on the internet or when the user stays away from the system.

According to one embodiment of the present invention, the finger print of the real user is also changed during a browsing process.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide system and method for simulating a virtual internet user using an algorithm in order to protect the privacy of an actual internet user. For every real internet user, one algorithmically simulated virtual user is run in the background of the computing device, without a graphical user interface.

According to an embodiment herein, the simulated user browser is created to include the plurality of extracted browser characteristics, the plurality of detected tracking elements and the plurality of identified device finger printing characteristics of the real user.

According to an embodiment herein, the browser characteristics of the simulated virtual user is digitally identical to the extracted browser characteristics of the real user browser.

According to an embodiment herein, the detected tracking elements of the real user browser is embedded in the simulated virtual user browser to draw an internet tracker away from the real user browser.

According to an embodiment herein, the plurality of identified device finger printing characteristics of the real user browser is duplicated on the simulated user browser.

According to an embodiment herein, the browser characteristics are selected from a group consisting of IP address, user agent, browser fonts, plugins, browser name and browser versions.

According to an embodiment herein, the tracking elements are selected from a group consisting of persistent cookies, html5 local storage and indexed database.

According to an embodiment herein, the plurality of identified device finger printing characteristics of the real user browser is duplicated on the simulated user browser by creating an unstable fingerprint to protect a user-privacy against fingerprinting to configure a single device to have a plurality of device finger printing characteristics at a plurality of time periods respectively. The plurality of device finger printing characteristics at a plurality of time periods are mutually different.

According to an embodiment herein, the plurality of identified device finger printing characteristics of the real user browser is duplicated on the simulated user to mask the real user browser.

According to an embodiment herein, the plurality of the device finger printing characteristics of the simulated user is identical to the device finger minting characteristics of the real user browser.

According to an embodiment herein, the simulated user browser is created without visual inputs and user inputs via a GUI to provide a non-invasive experience to the user by running the simulated user browser in the background.

According to an embodiment herein, the simulated user browser is created in real time.

According to an embodiment herein, the simulated user browser is created when the real user browses on the internet or when the user stays away from the system.

According to one embodiment herein, a system and a method are provided for algorithmically simulating an internet browsing condition using the actual users' cookies so that the third-party trackers are unable to distinguish the real user from the simulated users.

According to one embodiment herein, a system and method are provided for algorithmically simulating multiple versions of a same internet user. With each simulated user being at a different location, a tracking of the real user is difficult.

According to one embodiment herein, a system and a method are provided to enable privacy to the internet-users, without the inconvenience of browsing in "incognito" mode. An internet user's cookies and local storage information are extracted irrespective of the physical internet browser used by the user. The cookies and local storage information are merged with a real user's Internet browser so that the tracking information disseminated during simulated browsing is a part of the user's physical browser.

According to one embodiment herein, a system and method is provided for algorithmically simulating internet browsing. The simulated internet user shows an intent to purchase or sell multiple products and services, is provided. The multiple interests of the simulated user are achieved through a plurality of proprietary algorithms. The simulated user is enabled for real-time exchange of tracking elements such as cookies, HTML5 local storage, indexed database etc., with a real user.

According to one embodiment herein, a system and a method are provided for algorithmically simulating an Internet browsing condition, using the actual user's browser fingerprint. The simulated users use the same finger printing characteristics of the real user. Due to the duplication of browser fingerprint, the trackers are unable to distinguish the real user from the simulated users. Since the simulated user displays a real intent to purchase goods and services on internet, the third party trackers are drawn towards the simulated user and away from the real user.

According to one embodiment herein, the device finger printing characteristics include elements such as User Agent, IP Address, HTTP Headers, JavaScript function, plugins details, System Fonts, System Time, etc.

According to one embodiment herein, a system is provided for algorithmically simulating an internet user. The system comprises at least one Real Internet User Browser with a set of Real User Browser Characteristics, such as User Agent, Fonts, Plugins, IP address, browser cookies, browser fingerprint, HTML5 local storage, indexed database etc. A Simulated User Web Browsing module uses the Real User Browser Characteristics to simulate a virtual Internet user. The simulated virtual user uses the multiple proprietary Algorithms to show an intent to purchase or sell multiple products and services on Internet.

According to one embodiment herein, a method is provided to algorithmically simulate an internet user. The process comprises the following steps of extracting and assimilating Real User Browser Characteristics such as User Agent, Fonts, Plugins, IP address, etc. A two-way sharing of Tracking Elements with Real User Browser is carried out. The algorithm is run with an intent to purchase Goods or Services on Internet and Web Browsing of Algorithmic Intent is enabled. The process is recursive as the simulated user extracts information from the real user in real-time and Internet Trackers are diverted towards the simulated user.

According to one embodiment herein, a system and a method are provided for preventing an effective device fingerprinting across any computing device including mobile and non-mobile computing devices by generating multiple finger prints.

According to one embodiment herein, a system and a method are provided to change a device finger printing characteristics at periodic time intervals by randomly changing the device finger printing characteristics comprising the elements such as cookies. HTML5 local storage, indexed database etc., to create a plurality of fingerprints for the same real user to mask the real user.

According to one embodiment herein, a system and a method are provided to enable user-privacy against fingerprinting, by creating an unstable fingerprint so that a same device appears to have a different device fingerprint at various points in time.

According to one embodiment herein, a system and a method are provided for preventing an effective device fingerprinting of the real user browser. The system and methods are used to change the device finger print at periodic time intervals thereby preventing an accurate tracking of a user device. The two main elements needed for effective device fingerprinting are diversity and stability. By exhibiting diversity, no two devices possess the same set of characteristics that constitute the device's fingerprint. Through stability, the fingerprint of a device remains stable and constant within a certain confidence-interval.

According to one embodiment herein, the system and method are provided to enable a user-privacy against fingerprinting by creating an unstable fingerprint. Instability refers to the fact that the same device appears to have a different fingerprint at various points in time. Irrespective of the diversity exhibited by the device, various elements of the device fingerprint are overridden and/or modified by the present embodiment, thereby resulting in an inability of the trackers in effectively tracking and fingerprinting the device.

According to one embodiment herein, the system and method are provided to generate multiple finger prints by randomly changing any one or all the characteristics of a device finger print in periodic time intervals. Multiple fingerprints are generated by overriding the various elements of the fingerprints. For example, by overriding/changing information about browser, hardware, device time, plug-ins, system fonts, HTML5 elements, content filters, etc., in each time, the device is fingerprinted, to change the fingerprint. The elements may further include clock skew, etc., which are also used for fingerprinting.

According to one embodiment herein, the system and method are configured to override/change the values of all or some of these elements in an effort to continually change the device fingerprint.

According to one embodiment herein, the system and method are configured to override/change the various pieces of information that are probed by the trackers. This information is overridden either in the Client Web Browser or by using a non-browser process or both.

When a tracker script is run on the client machine, in order to collect the various pieces of information, instead of the actual information, the doctored/overridden information is provided to the tracker. The information fed to the trackers is different at different points in time. The feeding of inaccurate information leads to an inaccurate fingerprint thereby changing the actual fingerprint data.

The system and method of the embodiments herein are configured to change the finger print data randomly at periodical intervals to prevent tracking. The system and method provides no inconvenience to the user by eliminating the need for the user to change the current browsing behavior. Further the system and method provides stability of the fingerprint.

According to one embodiment herein, the system and method are provided to generate multiple finger prints for the user periodically by randomly changing the finger print characteristic elements at different time intervals. The finger print characteristic elements include, but not limited to User Agent, IP Address, HTTP Headers, JavaScript function, plugins details, System Fonts, System Time, etc. By changing these characteristics randomly, multiple fingerprints are created at different time intervals for the same real user.

According to one embodiment of the present invention, the finger print of the real user is also changed during a browsing process.

Figure 1:
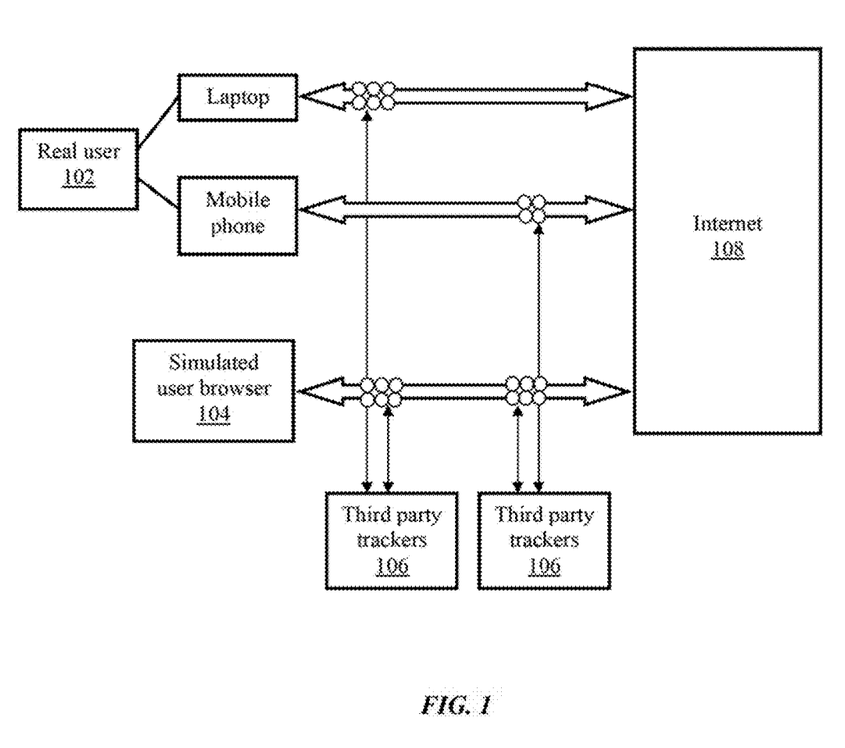
FIG. 1 illustrates a block diagram of a system architecture of a portal or platform provided with a system for simulating a real user, according to one embodiment herein.

FIG. 1 illustrates a block diagram of a system architecture of a portal or platform provided with a system for simulating a real user, according to one embodiment herein. With respect to FIG. 1, the system comprises a real user 102, a simulated user browser 104, third party trackers 106 and internet 108. The real user 102 browses different search websites on the interact 108. The search websites are selected from a group consisting of Google, Yahoo, and Bing. The real user 102 uses a user device for browsing the internet 108. The user device is selected from a group consisting of a laptop, a desktop computer, a mobile phone, a smart phone and a tablet. As the real user initiates browsing on the internet, a simulated user browser 104 is algorithmically simulated by a simulator. When the algorithm is executed, the simulated user browser 104 performs complex internet browsing and display an intent to purchase and sell goods and services on internet 108.

The simulated user browser 104 incorporates the real user 102 browsing characteristics, tracking elements, fingerprint and interest. The cookies and the local storage of the real user 102 are merged with the simulated user browser 104. Therefore, the third party trackers 106 are forced to track the cookies from the real user's 102 browser and the simulated user browser 104, thereby obfuscating the third party trackers 106. The algorithmically simulated user browser 104 behaves identical to the real user browser, thereby misguiding the third party trackers 106 to follow the simulated user browser 104.

Figure 2A:
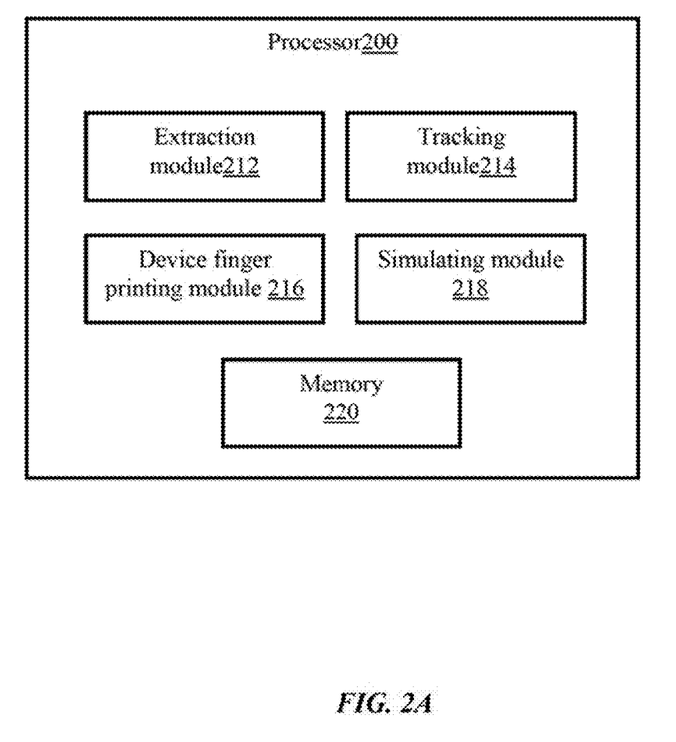
FIG. 2A illustrates a block diagram of a system for simulating a real user browser, according to one embodiment herein.
Figure 2B:
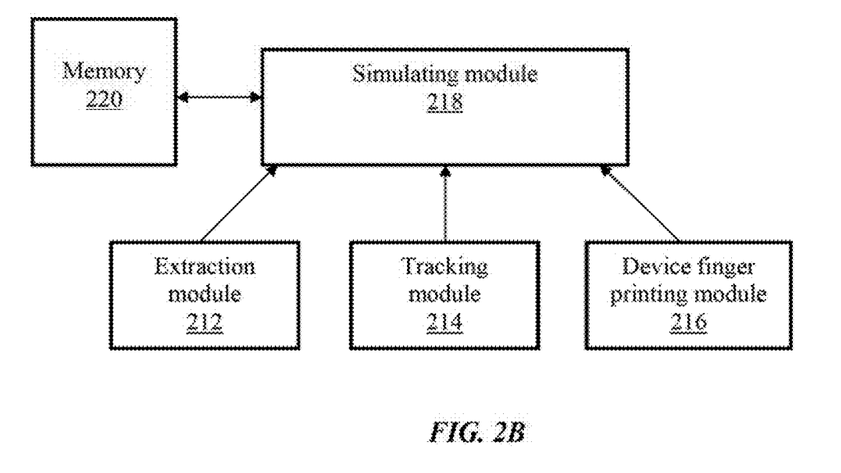
FIG. 2B illustrates a block circuit diagram of a system for simulating a real user browser, according to one embodiment herein.

FIG. 2A illustrates a block diagram of a system for simulating a real user browser, according to one embodiment herein. FIG. 2B illustrates a block circuit diagram of a system for simulating a real user browser, according to one embodiment herein. With respect to FIG. 2A and FIG. 2B, the system for simulating the real user without a graphical user interface (GUI) comprises a processor 200. The processor 200 comprises an extraction module 212, a tracking module 214, a device finger printing, module 216, a simulating module 218 and a memory 220. The instructions/algorithm for simulating the real user is stored a non-transitory storage medium called the memory 220. The instructions/algorithms are run on the processor 200 in a computing system to execute the steps of simulating the real user browser.

According to an embodiment of the present invention, the extracting module 212 is configured to extract plurality of browser characteristics of the real user. The plurality of the browser characteristics are selected from a group consisting of IP address, user agent, browser fonts, plugins, browser name and browser versions. The browser characteristics extracted by the extracting module 212 are communicated to the simulating module 218 in the processor 200. The simulating module 218 creates the simulated user browser with the extracted browser characteristics of the real user. Therefore, the browser characteristics of the simulated user browser are digitally identical to the extracted browser characteristics of the real user browser.

According to an embodiment of the present invention, the tacking module 214 is configured to detect a plurality of tracking elements of the real user browser. The plurality of the tracking elements are selected from a group consisting of persistent cookies, html5 local storage and Indexed database. The detected tracking elements are shared with the simulating module 218 in the processor 200. The detected tracking element of the real user browser is embedded into the simulated user browser by the simulating module 218. The detected tracking elements are embedded in the simulated virtual user browser to draw an internet tracker away from the real user browser.

According to an embodiment of the present invention, the device finger printing module 216 is configured to identify a plurality of device finger printing characteristics of the real user browser. The plurality of identified device finger printing characteristics is communicated to the simulating module 218 in the processor 200. The simulating module 218 duplicates the plurality of identified device finger printing characteristics on the simulated user browser. The plurality of identified device finger printing characteristics of the real user browser is duplicated on the simulated user to mask the real user browser. The plurality of the device finger printing characteristics of the simulated user is identical to the device finger printing characteristics of the real user browser. The plurality of identified device finger printing characteristics is duplicated by creating an unstable fingerprint to protect a user-privacy against fingerprinting. The simulating module 218 configures a single device to have a plurality of device finger printing characteristics at a plurality of time periods respectively. The plurality of device finger printing characteristics at a plurality of time periods/intervals is mutually different.

According to an embodiment of the present invention, the simulating module 218 simulates the real user browser without the GUI to create a simulated user browser. The simulated user browser is created to include the plurality of extracted browser characteristics, the plurality of detected tracking elements and the plurality of identified device finger printing characteristics of the real user. The simulated user browser is created without visual inputs and user inputs via a GUI to provide a non-invasive experience to the user by running the simulated user browser in the background. The simulated user browser is created in real time when the real user browses on the internet or when the user stays away from the system.

Figure 2C:
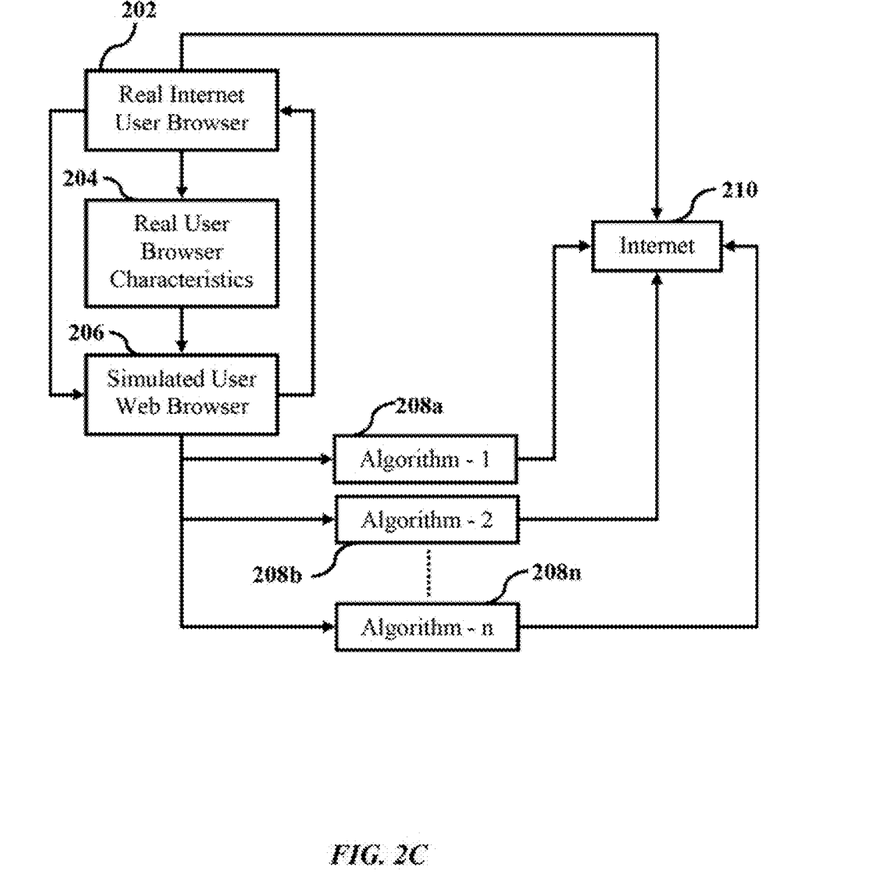
FIG. 2C illustrates a functional block diagram of a system for algorithmically simulating an internet user, according to one embodiment herein.

FIG. 2C illustrates a functional block diagram of a system for algorithmically simulating an internet user, according to one embodiment herein. With respect to FIG. 2C, the system comprises at least a Real Internet User Browser 202. The Real Internet User Browser 202 browses the Internet 210 with a set of Real User Browser Characteristics 204. The set of Real Use Browser Characteristics 204 includes IP Address, User Agent, Browser Fonts, Plugins, etc. A Simulated User Web Browser 206 is created algorithmically by the system. The Simulated User Web Browser 206 is operated without any graphical user interface (GUI). The Simulated User Web Browser 206 is created without visual inputs or user input via the GUI. The Simulated User Web Browser 206 is created by including the set of Real User Browser Characteristics 204 of the Real Internet User Browser 202. Therefore, the Simulated User Web Browser 206 appears digitally identical to the Real Internet User Browser 202.

Further, Simulated User Web Browser 206 is configured to share the tracking elements with the Real Internet User Browser 202. The shared tracking elements are selected from a group consisting of persistent cookies, html5 local storage and Indexed database. The tracking elements such as the real internet user's cookies and local storage information are merged with the Real Internet User Browser 202 so that tracking information disseminated during a simulated browsing is a part of the user's physical browser. Therefore, the Simulated User Web Browser 206 has the Real User Browser Characteristics 204 and tracking element is identical to that of the Real Internet User Browser 202. One of the major tracking elements is the finger print on the Real Internet User Browser 202. The Simulated User Web Browser 206 uses the same finger printing characteristics of the Real Internet User Browser 202. Due to the duplication of browser fingerprint, the trackers are unable to distinguish the Real Internet User Browser 202 from the Simulated User Web Browser 206.

According to an embodiment of the present invention, the system initiates multiple proprietary algorithms 208a, 208b . . . 208n to enable the Simulated User Web Browser 206 to intend to purchase or sell multiple products and services on the interact 210. The Simulated User Web Browser 206 has multiple interests based on the Real User Browser Characteristics 204 and tracking elements. The privacy of the Real Internet User Browser 202 is attained by Simulated User Web Browser 206 with multiple and diverse real user interests. Therefore, the trackers lose the scent of the Real Internet User Browser 202 and interests and instead follow the scent of the Simulated User Web Browser 206. The multiple proprietary algorithms 208a, 208b . . . 208n is configured to equip the Simulated User Web Browser 206 with diverse and multiple interests of the Real Internet User Browser 202. Since Simulated User Web Browser 206 displays a real intent to purchase goods and services on internet 210, the third party trackers are drawn towards the Simulated User Web Browser 206 and away from the Real Internet User Browser 202.

Figure 3:
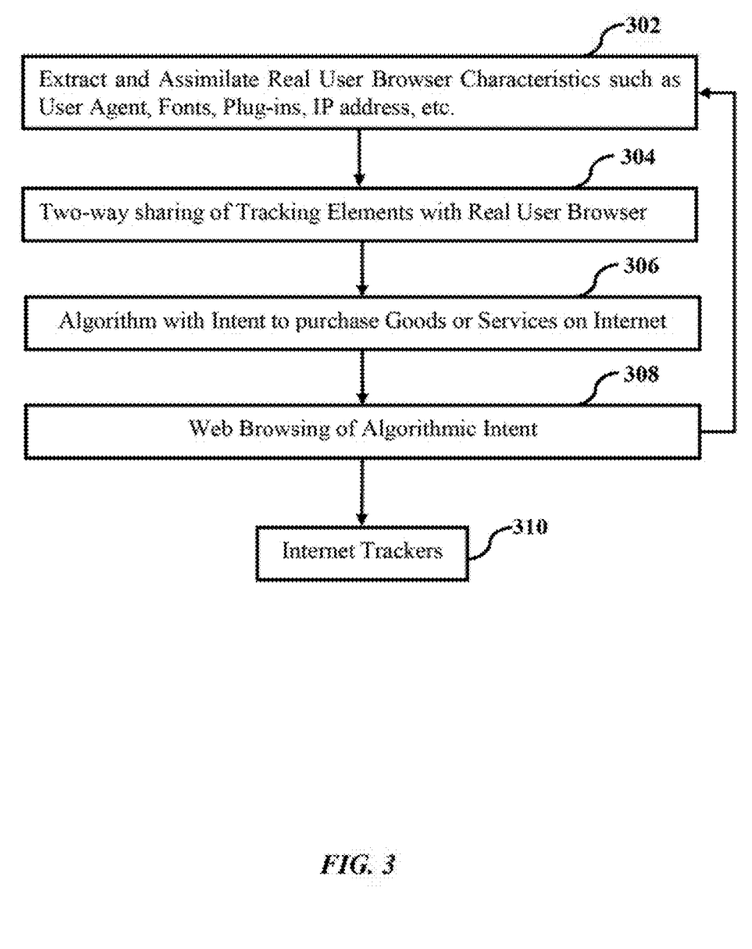
FIG. 3 illustrates a flow chart explaining a method for algorithmically simulating an internet user, according to one embodiment herein.

FIG. 3 illustrates a flow chart explaining a method for algorithmically simulating an internet user, according to one embodiment herein. The method comprises the steps of extracting and assimilating the Real User Browser Characteristics (302). The Real User Browser Characteristics are selected from a group consisting of user agent, fonts, plug-ins, IP address, etc. The real user browser characteristics are used for creating a simulated web browser. The simulated user web browser is created without a graphical user interface. The simulated user web browser is operated in the background and does not require user inputs and visual inputs. The simulated user we browser has digitally identical characteristics of a real user browser.

According to one embodiment of the present invention, the method includes two-way sharing of the tracking elements with the real user browser (304). The tracking elements are selected from a group consisting of persistent cookies, html5, local storage information and Indexed DB. The tracking elements such as the real internet user's cookies and local storage information are merged with the Real Internet User Browser so that the tracking information disseminated during a simulated browsing is a part of the users physical browser. Therefore, the simulated user web browser has the real user Browser Characteristics and tracking element identical to the Real User Browser.

Further, the method initiates multiple proprietary algorithms displaying intent to purchase or sell multiple products and services on the internet (306). The algorithms equip the simulated user web browser with multiple interests in browsing the internet. The multiple interests are identified based on the real user browser characteristics and tracking elements. The privacy of the real internet user browser is attained by simulated user web browser with the use of multiple "user interests" with specific intent. Internet browsing is performed by the simulated user web browser based on algorithmic intent (308). The algorithm is executed so that the simulated user web browser is configured to search and browse different websites related to a particular interest of the real user. Moreover, the algorithm displays a real intent to purchase goods and services on interact rather than merely browsing the interact, thereby going a real feel of a user browsing the internet. The algorithm is configured to act smartly to draw the internet trackers towards the simulated user web browser (310). The trackers lose the scent/track of the real internet user browser and interests and instead follow the scent/track of the simulated user web browser. The steps of the method are repeated each time a real user browser is initiated by the user. The method of algorithmically generating a simulated user web browser is executed in real time whenever a user browses on the internet. The method is also be performed by the processor when the real user is away from the system as no visual input or user input is required.

Figure 4:
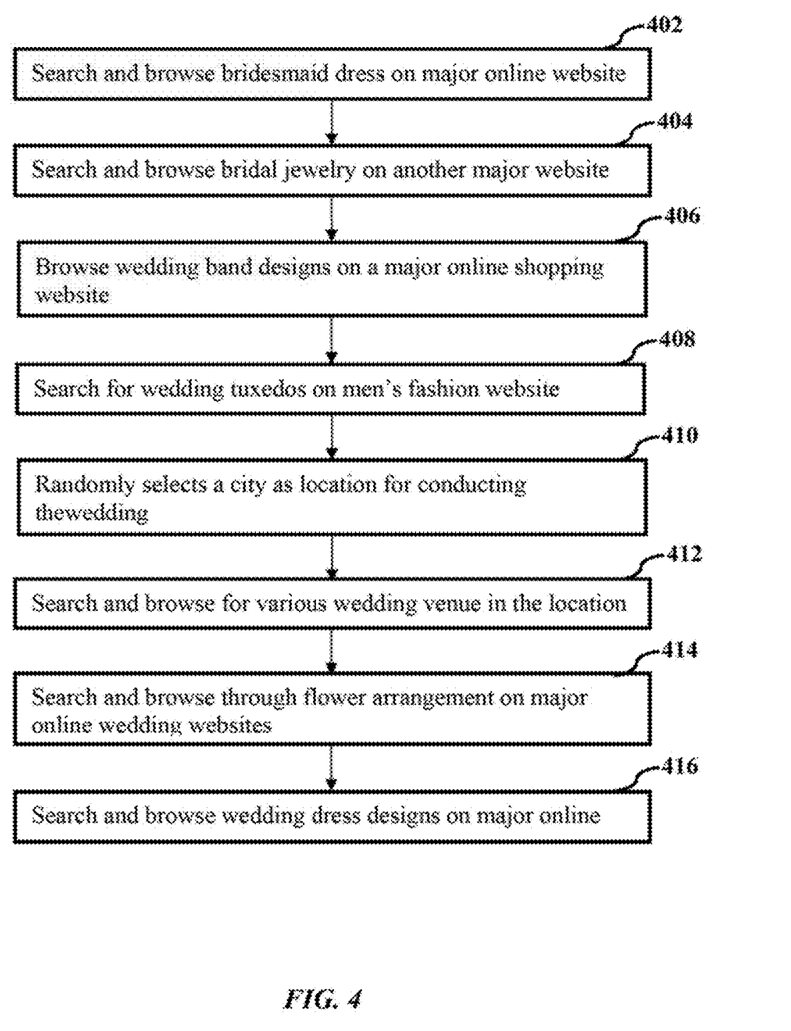
FIG. 4 illustrates a flow chart explaining the process steps in a method of simulating a web browser using, a wedding planning algorithm, according to one embodiment herein.

FIG. 4 illustrates a flow chart explaining the process steps in a method of simulating a web browser using a wedding planning algorithm, according to one embodiment herein. In the exemplary illustration wedding planning algorithm intends to purchase and sell the good and services on the internet. The system executes the wedding planning algorithm to suite with the multiple interest of the real user. With the execution of the algorithm, the system is configured to search and browse on different websites related to wedding planning and display a real intent to purchase goods and services in the internet. Once the algorithm is executed, the simulated web user browser is configured to initially search and browse bridesmaid dress on major online website (402). Further, the simulated web user browser is operated to search and browse bridal jewelry on another major website (404). Then the simulated web user browser is run with an intent to purchase wedding bands, by browsing wedding band designs on a major online shopping website (406). Further, the simulated web user browser is configured to search for wedding tuxedos on men's fashion website (408). The simulated web user browser is configured algorithmically to plan for the venue of the marriage. The simulated web user browser is operated to randomly select a city as location for conducting the wedding (410). Further, the simulated web user browser is run to search and browse for various wedding venue in the location selected (412). The simulated web user browser is configured to search and browse through flower arrangement on major online wedding websites (414). The simulated web user browser is further operated to search and browse wedding dress designs on major online wedding websites (416). Therefore the algorithm displays a real intent to purchase goods and services on internet rather than merely browsing the internet, thereby giving a real feel of a user browsing the internet. The algorithms are configured to act smartly to achieve a privacy by drawing the internet trackers towards the simulated user web browser and away from the real user web browser.

Figure 5:
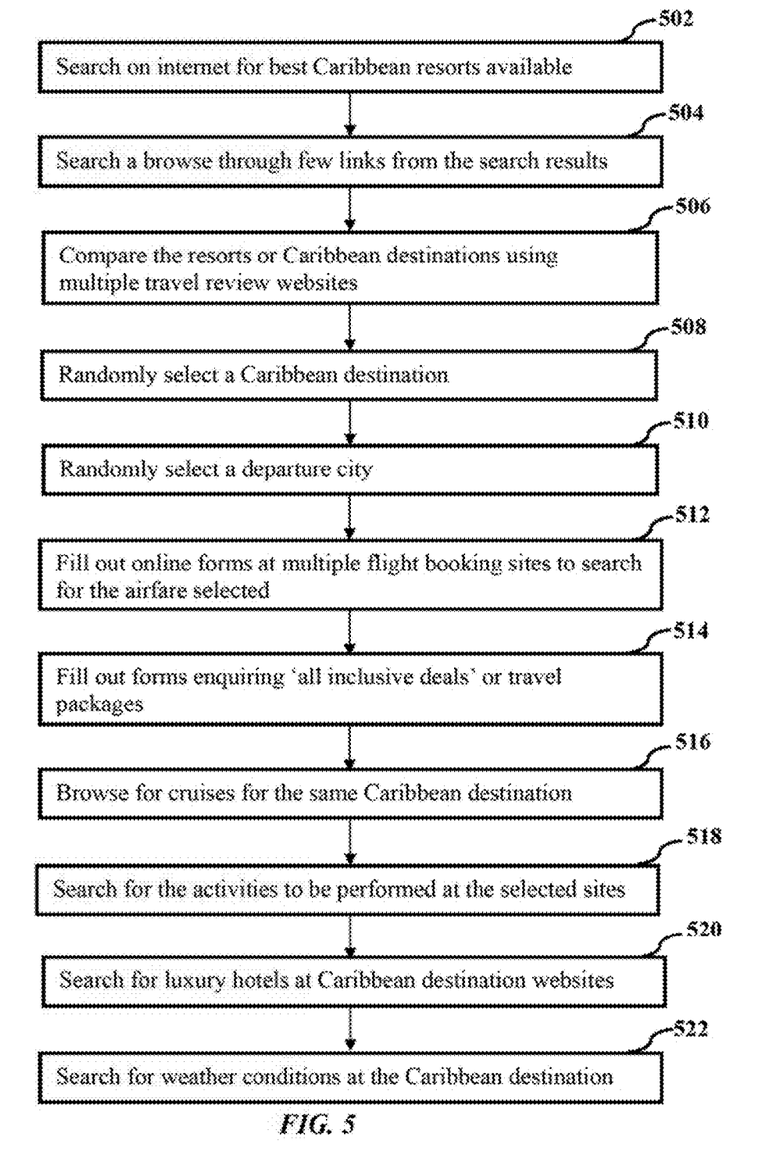
FIG. 5 illustrates a flow chart explaining the process steps in a method of simulating a web browser using a travel algorithm, according to one embodiment herein.

FIG. 5 illustrates a flow chart explaining the process steps in a method of simulating a web browser using a travel algorithm, according to one embodiment herein. In the exemplary illustration, a travel algorithm is executed to enable a simulated user web browser to display an intent to purchase the goods and services on internet. The travel algorithm is chosen by the system to comply with the multiple interest of the real user. The multiple interest of the real user is identified from the browsing characteristics and the tracking elements. Further the algorithm equips the simulated user web browser to perform an internet browsing by incorporating the browsing characteristics of the real user.

Once the travel algorithm is executed, the simulated user web browser is enabled to search the internet for best Caribbean resorts available (502). The simulated user web browser is further configured to browse through few links from the search results provided by the search websites (504). The search websites is selected from a group consisting of Google, Yahoo, and Bing etc. Further, the simulated user web browser is enabled to compare the sorts or Caribbean destinations using multiple travel review websites (506). The travel review websites are selected from a group consisting of Trip Advisor, Make my trip etc. Further, a Caribbean destination is selected randomly by the simulated user web browser (508). Further, the simulated user web browser is enabled to plan the travel by booking flights or others modes of transport. The simulated user web browser is enabled to randomly select a departure city (510). Once the departure city is selected, the simulated user web browser is enabled to fill out online forms at multiple flight booking sites to search for the airfare from the departure city to the destination city (512). The airfare is checked for a future date. After checking the airfare, the simulated user web browser is configured to go back to the major travel review websites to fill out forms enquiring 'all inclusive deals' or travel packages provided by the travel review website (514). Further, the simulated user web browser is run to search for any other modes of transport to the Caribbean destination. The simulated user web browser is enabled to browse for cruises for the same Caribbean destination (516). The search is performed for future dates. The simulated user web browser is enabled to plan the travel including the places to visit, the activities to be performed, places to stay etc. The simulated user web browser is enabled to search for the activities to be performed at the selected destination (518). Further, the simulated user web browser is run to search for luxury hotels at Caribbean destination for overnight stay at the destination (520). The algorithm further enables the simulated user web browser to search for weather conditions at the Caribbean destination (522). Therefore, the proprietary travel algorithm is configured to perform a complex internet browsing with intent to purchase goods and services on the internet. The internet trackers are therefore misguided from the real user to follow the simulated user web browser.

Therefore the system and method for simulating internet browsing system for user without graphical user interface eliminates the need of masking a real user's identity. The system provides a privacy without the need of blocking out the tracking elements. The system enables the real user to use Internet browsers of the user's choice freely and use web browsing elements required to enjoy the best browsing experiences. Further, the system enables the real user to keep the cookies and tracking elements without the fear of being tracked by the interact trackers. Therefore, the system eliminates the inconvenience of multiple logins to different websites.

The system instead of blocking out the tracking elements, is configured to make use of the tracking elements to attain privacy. The system uses the tracking elements against the trackers and misguides the trackers to a simulated web browser. The system misguides the interact trackers from tracking the real user based on the fingerprint on the website. The system duplicates the fingerprint on the simulated web browser, thereby drawing the internet trackers away from the real user. Therefore, the system enables the simulated web browser to behave identical to a real user browser incorporating the real user browser characteristics, tracking elements, real user interests and fingerprint, thereby misguiding the trackers.

According to one embodiment of the present invention, the finger print of the real user is also changed during a browsing process.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented method comprising instructions stored on a non-transitory storage medium and run on a hardware processor in a computing system provided with a memory to execute one or more algorithms for simulating internet browsing system without graphical user interface (GUI), wherein the method comprises the steps of:

extracting a plurality of browser characteristics of a real user browser with an algorithm using with an extraction module;

detecting a plurality of tracking elements of the real user browser with an algorithm using a tracking module;

identifying a plurality of device finger printing characteristics of the real user browser with an algorithm using a device finger printing module:

simulating the real user browser without the GUI to create a simulated virtual user browser by using a simulating module, and wherein the simulated virtual user browser is created to include the plurality of extracted browser characteristics, the plurality of detected tracking elements and the plurality of identified device finger printing characteristics of the real user, and wherein the browser characteristics of the simulated virtual user browser is digitally identical to the extracted browser characteristics of the real user browser, and wherein the detected tracking elements of the real user browser is embedded in the simulated virtual user browser to draw an internet tracker away from the real user browser, and wherein the plurality of identified device finger printing characteristics of the real user browser is duplicated on the simulated virtual user browser, and wherein the plurality of identified device finger printing characteristics of the real user browser is duplicated on the simulated virtual user browser by creating an unstable finger printing to protect a user-privacy against finger printing to configure a single device to have a plurality of device finger printing characteristics at a plurality of time periods respectively, and wherein the plurality of device finger printing characteristics at a plurality of time periods are mutually different, and wherein the simulating module is configured to simulate a virtual internet user for each real user and to embed the simulated virtual internet user with a plurality of interests to mask an actual browsing interests of the real user, and wherein the finger printing of the real user is also changed during a browsing process, and wherein the simulated virtual user browser is created in real time, and wherein the simulated virtual user browser is created when the real user browses on the internet or when the user stays away from the system, and wherein a plurality of versions of the same real user is created and wherein each simulated virtual user is positioned at a mutually different global location thereby making a tracking of the real user difficult, and wherein the simulated virtual internet user is configured to display a real intent to purchase goods and services on internet to draw third party trackers towards the simulated virtual internet user and away from the real user.

2. The method as claimed in claim 1, wherein the browser characteristics are selected from a group consisting of IP address, user agent, browser fonts, plugins, browser name and browser versions.

3. The method as claimed in claim 1, wherein the tracking elements are selected from a group consisting of persistent cookies, HTML5, local storage and Indexed database.

4. The method as claimed in claim 1, wherein the plurality of identified device finger printing characteristics of the real user browser is duplicated on the simulated virtual user browser to mask the real user browser using the simulating module.

5. The method as claimed in claim 1, wherein the plurality of the device finger printing characteristics of the simulated virtual user is configured to be identical to the device finger printing characteristics of the real user browser.

6. The method as claimed in claim 1, wherein the simulated virtual user browser is created without visual inputs and user inputs via a GUI to provide a non-invasive experience to the user by running the simulated virtual user browser in the background.

* * * * *